United States Patent
Kruppa

(10) Patent No.: US 9,511,788 B1
(45) Date of Patent: Dec. 6, 2016

(54) ACCESSORY PLATE EXTENSION FOR WHEELBARROW BRAKE SYSTEMS

(71) Applicant: Richard J Kruppa, Greenbrae, CA (US)

(72) Inventor: Richard J Kruppa, Greenbrae, CA (US)

(*) Notice: Subject to any disclaimer, the term of this patent is extended or adjusted under 35 U.S.C. 154(b) by 0 days.

(21) Appl. No.: 14/822,337

(22) Filed: Aug. 10, 2015

(51) Int. Cl.
*F16D 65/02* (2006.01)
*B62B 5/04* (2006.01)
*F16D 65/00* (2006.01)

(52) U.S. Cl.
CPC ......... *B62B 5/0438* (2013.01); *F16D 65/0056* (2013.01); *B62B 2005/0471* (2013.01)

(58) Field of Classification Search
CPC ............... F16D 65/02; F16D 65/0056; F16D 65/0062; F16D 2131/00; B62B 1/18; B62B 5/04; B62B 5/0438
USPC ................... 188/2 R, 17, 19, 26, 382, 9, 16; 280/205, 288.4
See application file for complete search history.

(56) References Cited

U.S. PATENT DOCUMENTS

| 5,411,120 A * | 5/1995 | Null ........................ B60T 1/065 188/112 R |
| 6,343,675 B1 * | 2/2002 | Seymour ................... B62L 3/00 188/24.11 |
| 6,443,267 B1 * | 9/2002 | Burbank ................... B62B 5/04 188/17 |

FOREIGN PATENT DOCUMENTS

WO    WO 0209997 A1 *  2/2002  ............... B62B 5/04

* cited by examiner

*Primary Examiner* — Thomas J Williams
(74) *Attorney, Agent, or Firm* — Steven A. Nielsen

(57) ABSTRACT

An accessory plate accommodates a caliper brake disc system in either a retrofit kit or in the original construction of wheelbarrows, hand carts and other wheeled, slow speed vehicles. The accessory plate or extension plate is secured to an axle or hub providing means of attachment to a caliper system. The accessory plate may be modified to accept other accessories, including but not limited to electric motors, drum brake arms and accessories, lights, battery packs or other accessories pertinent to the vehicle's enhanced operation. A hub system may be optionally used and may help to accommodate the installation of an accessory plate and/or rotor disc and/or drum brake or drum brake actuator.

8 Claims, 9 Drawing Sheets

ACCESSORY PLATE EXTENSION FOR WHEELBARROW BRAKE SYSTEMS

BACKGROUND OF THE INVENTION

Field of the Invention

The invention generally relates to wheelbarrow accessory systems. More particularly, the invention relates to the use of an accessory plate to facilitate the use of disc brakes on a wheelbarrow, hand cart or other wheeled implement not having brakes.

BRIEF SUMMARY OF THE INVENTION

Disclosed embodiments include an accessory plate or extension plate used in either a retro fit kit or in original construction of a wheelbarrow, hand cart or other wheeled implement. The extension plate may be attached in roughly the axle area of a wheel and may extend for a distance toward the outer circumference of a wheel to support a caliper brake system. A hub may support a brake disc that rotates with the axle. The caliper may press upon the brake disc to slow down the rotation of the axle to slow down or stop the wheelbarrow.

Disclosed embodiments include specialized hub systems to artfully accommodate the disclosed accessory plate. Disclosed embodiments include a locking lever system used to lock a brake in a stopped position.

REFERENCE NUMERALS IN THE DRAWINGS

Figure 1:
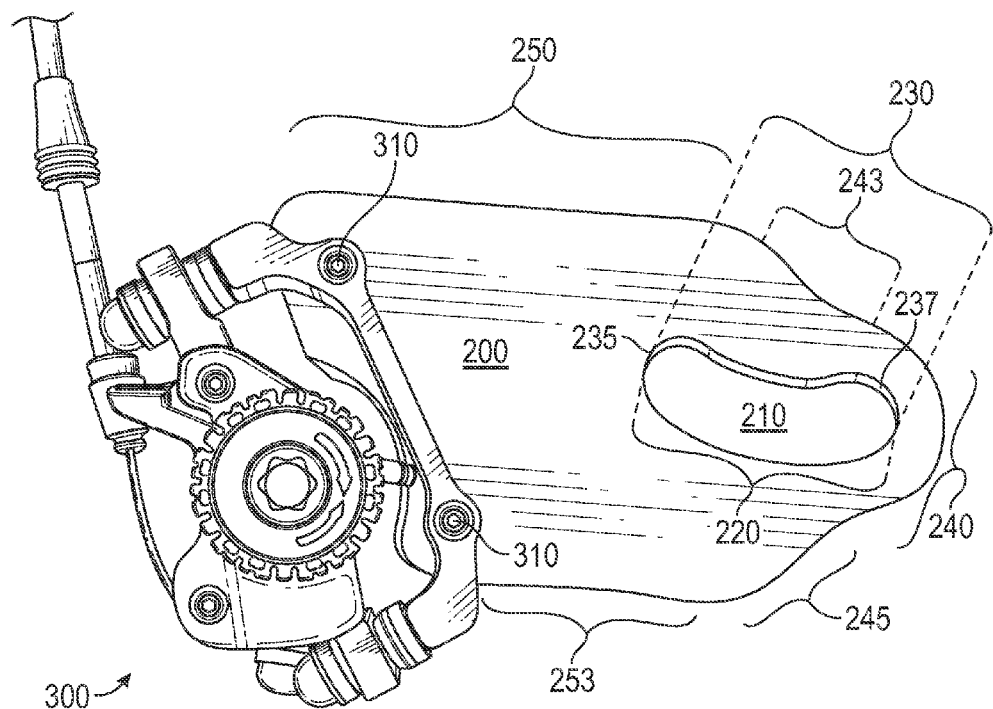
FIG. 1 is a perspective view of an extension plate and caliper system

100 a disclosed embodiment in general
200 accessory plate
203 axle side of accessory plate 200
206 brake side of accessory plate 200
209 connection voids for brake attachment
210 arcuate attachment void defined within accessory plate 200
220 arcuate wall section defining part of the arcuate attachment void 210
230 irregular wall section defining part of the arcuate attachment void 230
235 first radial curve section defining part of the arcuate attachment void 230
237 second radial curve section defining part of the arcuate attachment void 230
240 apex curve edge of axle side of accessory plate
243 first convex curve of axle side of accessory plate
245 second convex curve of axle side of accessory plate
250 upper straight edge of accessory plate
253 lower straight edge of accessory plate
260 convex curve of brake side
265 edge walls of accessory plate
300 caliper brake system
310 connection pins of caliper brake system 300
400 wheel and hub configuration
403 disc receiver hub—threaded or unthreaded
404 bearing spacer
405 bearing or bushing
406 alternative rotor mounting configuration
407 bearing extension to receive accessory plate 200
409 threaded hub portion to receive threaded disc plate
415 threaded inner hub
425 irregular lock nut
430 irregular outer surface of irregular lock nut 425
432 inner smooth circular surface of irregular lock nut 425
500 brake disc or brake rotor
510 spoke structure of brake disc 500
530 interior irregular void defined by spoke structure 510
600 tire
700 axle
705 inner axle
730 rim
800 lever system
810 clamp system of lever system
812 clamp ridge of clamp system
814 barrel retainer wall of clamp system
817 cuff receiver
820 cuff clip
823 brake lever
825 cuff release button
827 cable connection These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a caliper brake system 300 is shown in fixed attachment to a disclosed accessory plate 200 or extension plate. In the illustrated example, the caliper brake system 300 comprises connection pins 310 that secure the caliper brake system to the extension plate. The extension plate may define connection voids 209, shown in FIG. 11, to accept the connection pins 310.

An accessory plate 200 may define an arcuate attachment void 210. The unique shape of the arcuate attachment void 210 provides unique advantages in alignment and adjustable attachment of the accessory plate 200 to an axle or hub system wherein the accessory plate is adjusted in a curved or arcuate path to accommodate different wheel diameters and different brake disc diameters. The unique shape of the arcuate attachment void allows the walls of the void to be of near constant distance while allowing for arched movement of an axle or hub system.

An arcuate attachment void 210 may be comprised of or defined by a plurality of accessory plate edges, such edges or walls may comprise an arcuate wall section 220, an irregular wall section 230, with the irregular wall section attached to or part of a first radial curve section 235 and a second radial curve section 237.

The shape or configuration of the accessory plate 200 provides unique advantages in mounding a brake system to a wheel system. The accessory plate is formed to minimize unnecessary volume and to not interfere with wheel movement or to catch debris during use. For example, a disclosed accessory plate 200 may comprise an apex curve 240 attached to or contiguous with a first convex curve 243 and a second convex curve 245. The first convex curve 243 and the second convex curve 245 create finger holds useful for installation and prevents the accessory plate from blocking components near the axle.

Length of the accessory plate may be artfully achieved by an upper straight edge attached to or contiguous to the first convex curve 343 and by use of an lower straight edge 253.

Figures 2A, 2B:
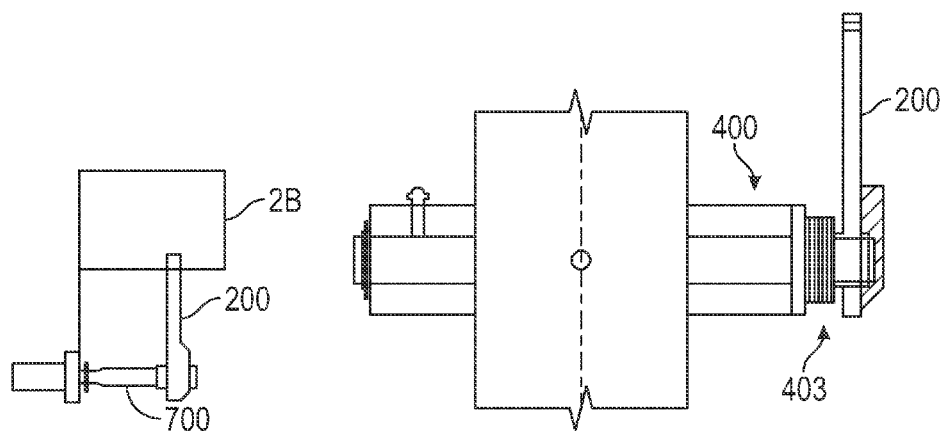
FIG. 2A elevational view of a hub and extension plate system
FIG. 2B is a plan view of a section of FIG. 2A

Referring to FIG. 2A, an elevation view presents an accessory plate 200 and axle. FIG. 2B presents a top plan view of a disclosed embodiment, which includes a wheel and hub configuration 400. FIG. 2B further depicts a threaded disc receiver hub 403.

Figure 3:
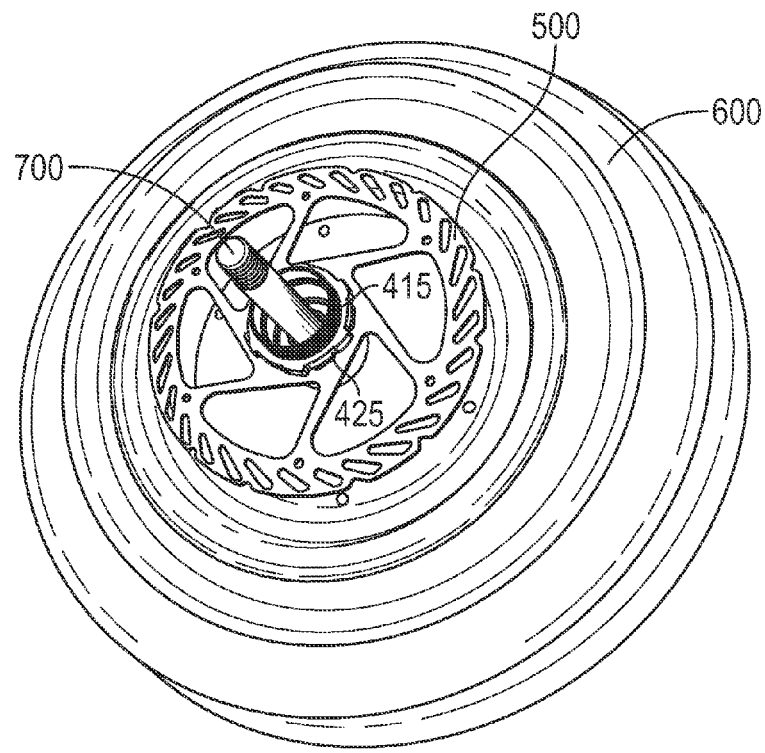
FIG. 3 is a perspective view of a partially assembled system

FIG. 3 depicts a perspective view of a tire 600 attached to a rim with the rim having an inner void configured to accept a wheel bearing, bushing or threaded inner hub 415, the threaded inner hub securing a brake disc 500 or brake rotor. The brake disc 500 may be more firmly attached by use of an irregular lock nut 425. An axle 700 may be retained within the hub system.

Figure 4:
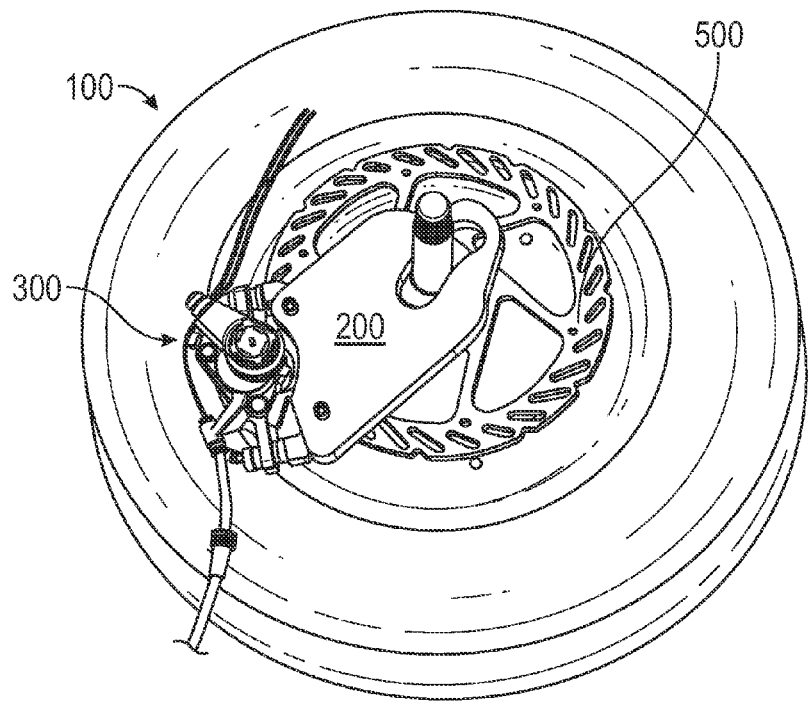
FIG. 4 is a perspective view of an extension plate and related components

FIG. 4 depicts a perspective view of a disclosed system 100 comprising an accessory plate 200 and an axle or bushing inserted though the arcuate attachment void of the accessory plate. The accessory plate 200 is attached to a caliper system 300, with the caliper system retaining outer circumference areas of a brake disc 500.

Figure 5:
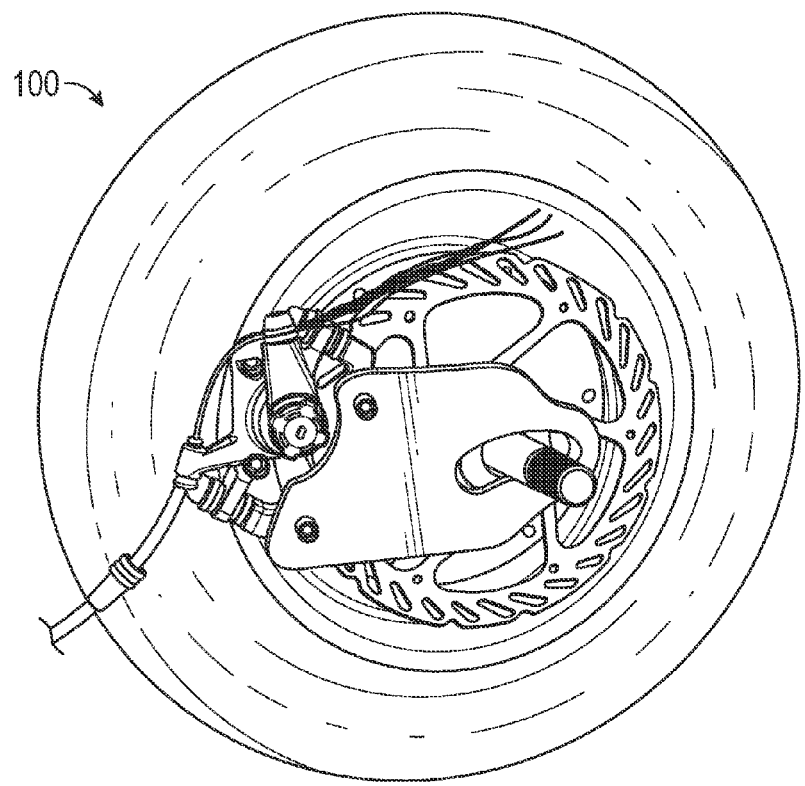
FIG. 5 is a perspective view of an extension plate and related components
Figure 6:
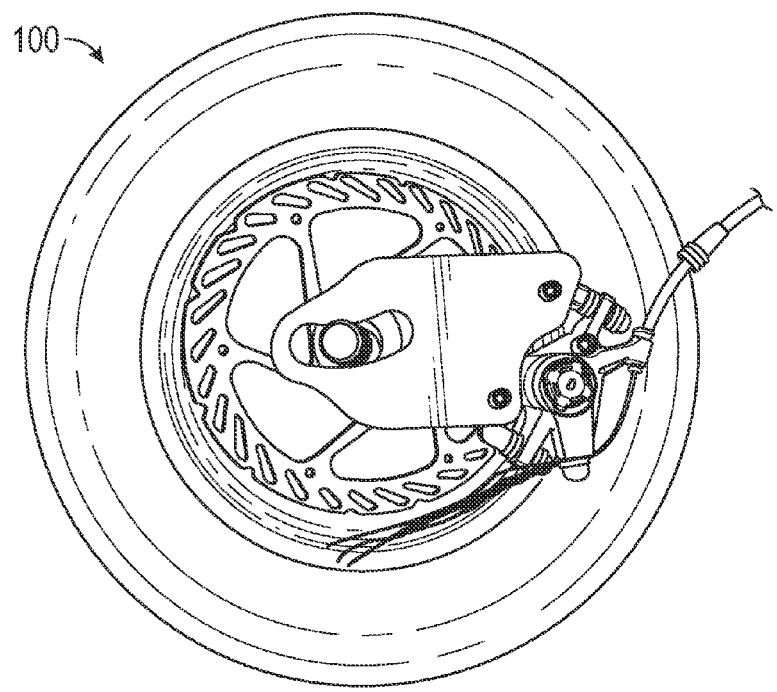
FIG. 6 is a perspective view of an extension plate and related components

FIG. 5 and FIG. 6 present different rotational views of FIG. 4.

Figure 7:
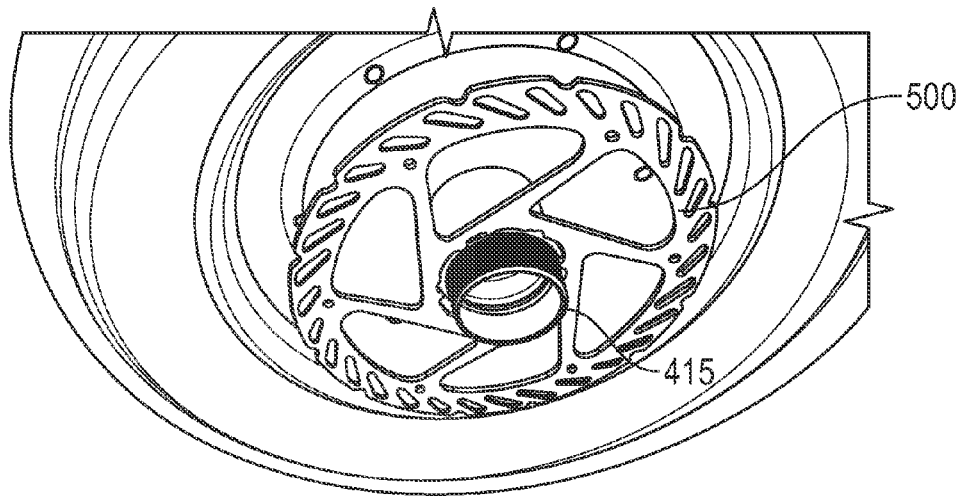
FIG. 7 is a perspective view of a brake disc and related components

FIG. 7 depicts a perspective view of a brake disc attached to a threaded inner hub 415.

Figure 8:
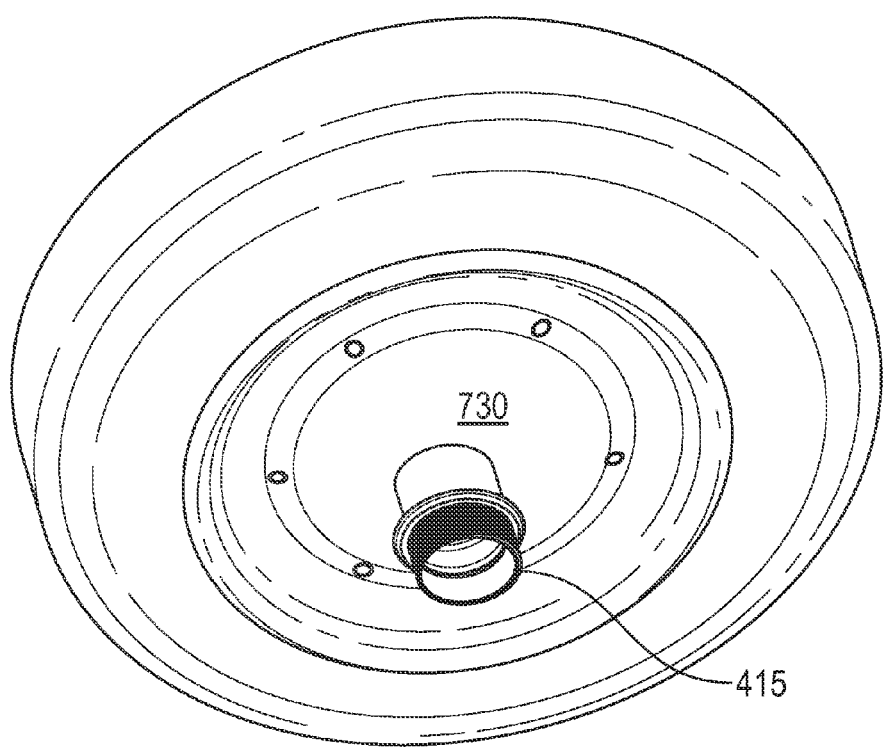
FIG. 8 is a perspective view of a hub and related components

FIG. 8 depicts a threaded inner hub 415 place through a center void of a rim 730.

Figure 9:
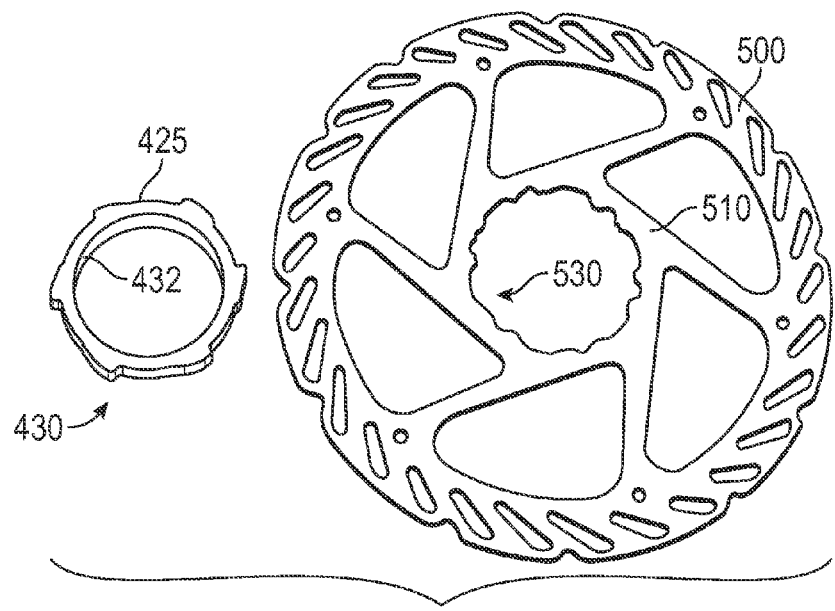
FIG. 9 is a perspective view of an irregular lock nut and brake disc

FIG. 9 depicts an irregular lock nut 425 comprising an irregular outer surface 425 and a smooth inner circular surface 432. The disclosed irregular lock nut 425 overcomes shortfalls in the art by providing extra secure attachment upon or within a brake disc 500 or brake rotor comprising an interior irregular void 530. A brake disc 500 may comprise a spoke structure 510 that defines the outer walls of an interior irregular void 530 configured to comport with the irregular outer surface 430 of an irregular lock nut 425.

Figure 17:
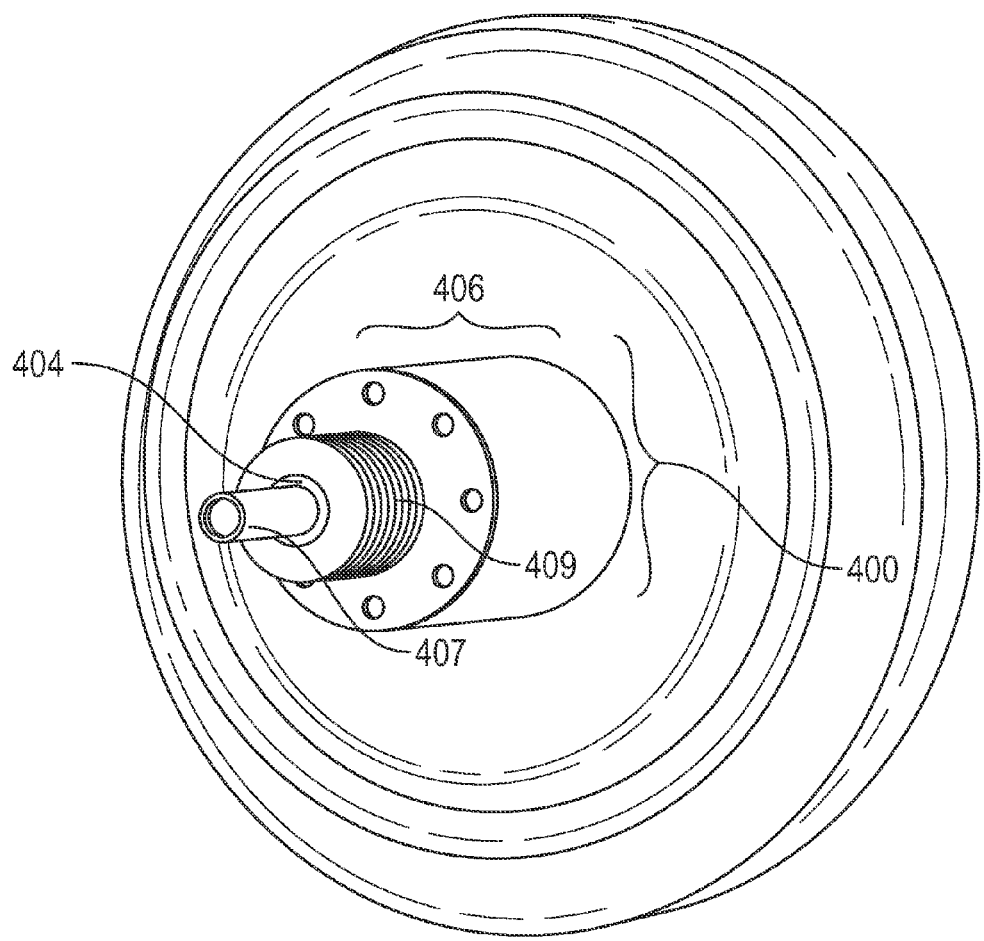
FIG. 17 is a perspective view of a hub system

The use of smooth lock nuts is also disclosed. The use of threaded brake rotors and threaded hub portions, see 409 FIGS. 17 and 403 FIG. 2B is also disclosed.

Figure 10:
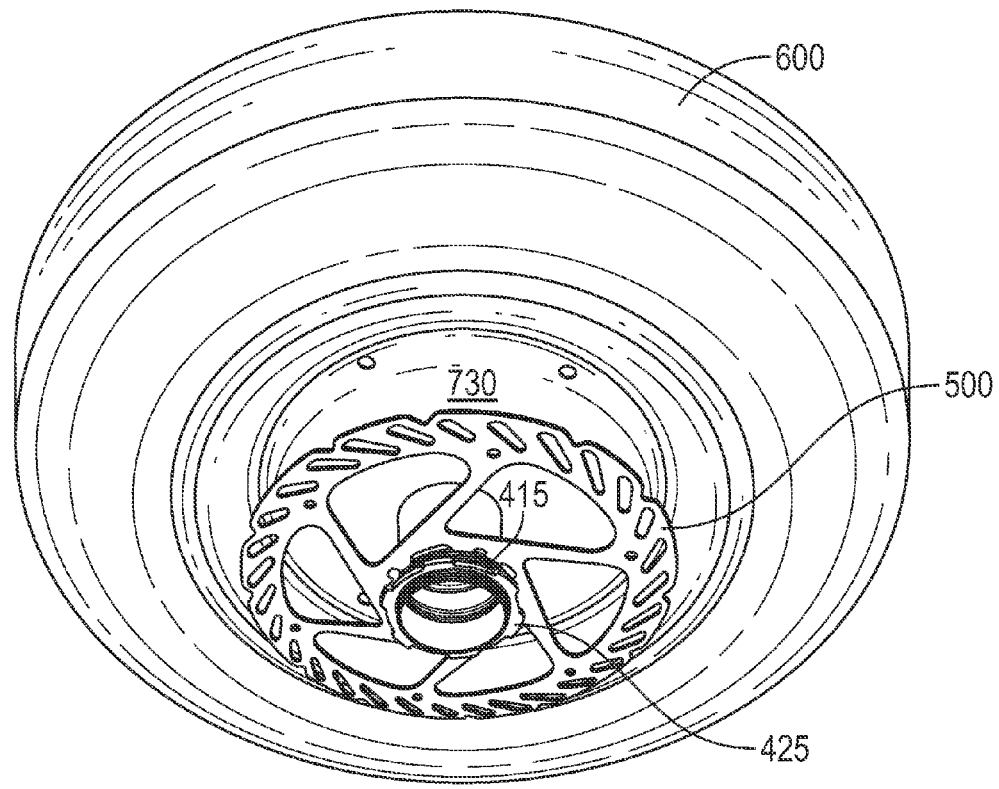
FIG. 10 is a perspective view of a brake disc mounted to a hub system

FIG. 10 depicts a perspective view of a tire 600 having a rim 730 with the rim attached to or containing a treaded inner hub 415, with the threaded inner hub inserted through or supporting a brake disc 500 and an irregular lock nut 425 securing the brake disc to the hub.

Figure 11:
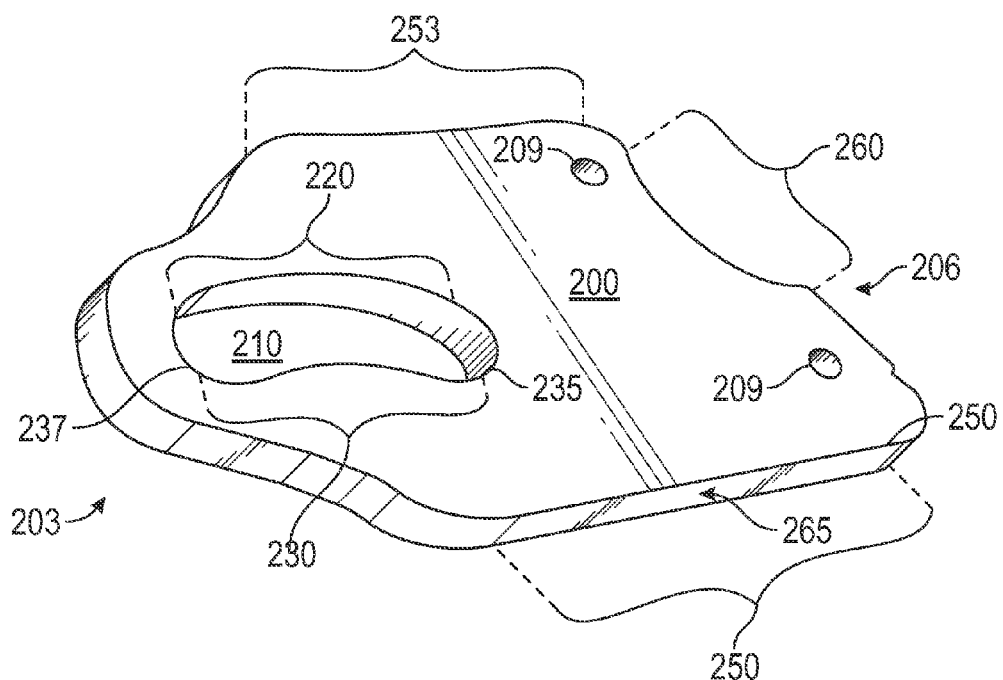
FIG. 11 is a perspective view of an extension plate

FIG. 11 depicts a perspective view of an accessory plate 200 comprising an axle side 203 and a brake side 206. The thickness or outer edges of an accessory plate 200 may be seen in the illustrated edge walls 265. A convex curve 260 of the brake side 206 assists in fitting a plurality of caliper systems to the accessory plate.

FIG. 11 further depicts an accessory plate 200 comprising a upper straight edge 250, lower straight edge 253, one or more connection voids 209, an arcuate attachment void 210 defined by a plurality of wall shapes and wall attributes, the arcuate attachment void 210 may be defined by an arcuate wall section 220, irregular wall section 230 and a first radial curve section 235 and a second radial curve section 237.

Figure 12:
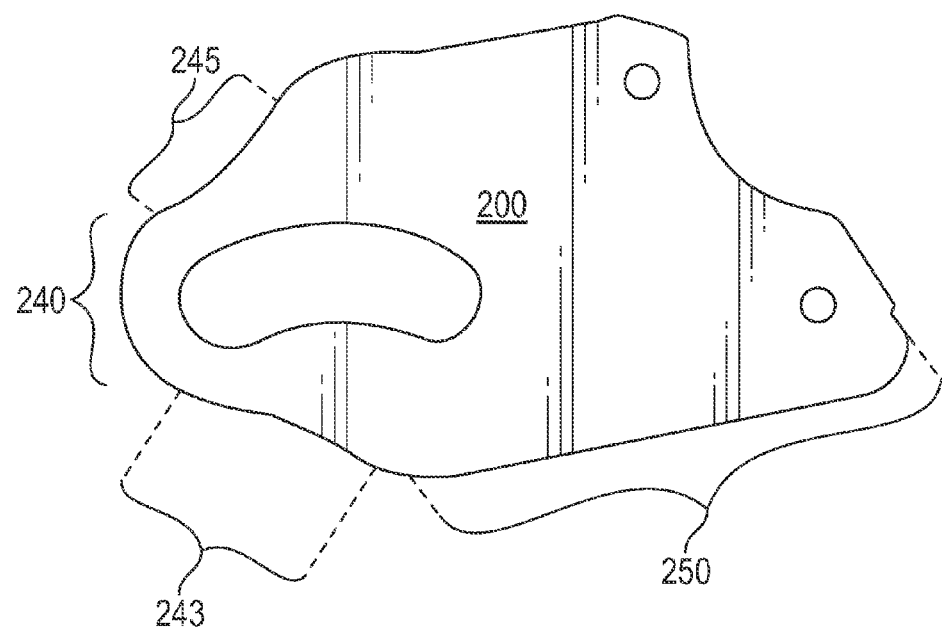
FIG. 12 is a plan view of an extension plate

FIG. 12 depicts a plan view of the accessory plate of FIG. 11 and FIG. 12 has been marked to show an apex curve 240 or apex curve edge as well as a first convex curve 243 and a second convex curve 245 of an axle side of an accessory plate.

Figure 13A:
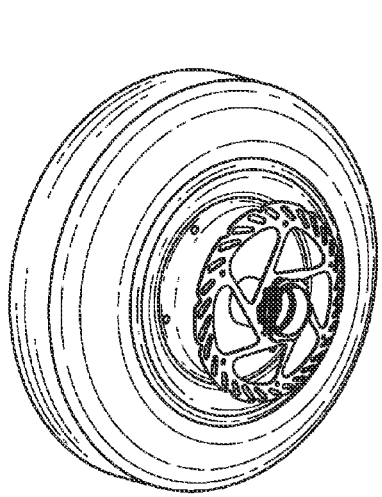
FIG. 13A is a perspective view of a brake disc and related components

FIG. 13A depicts a perspective view of a tire, rim, brake disc and hub system.

Figure 13B:
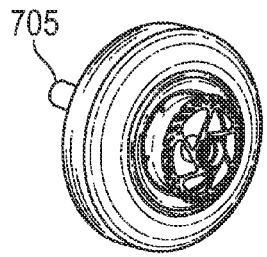
FIG. 13B is a perspective view of a brake disc and axle

FIG. 13B depicts a perspective view of a FIG. 13A but includes an inner axle 705.

Figure 13C:
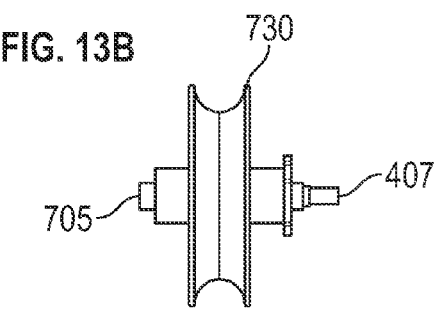
FIG. 13C is an elevation view of a hub system

FIG. 13C depicts an elevation view of a hub system comprising a bearing or bushing 405 and an inner axle 705.

Figure 14:
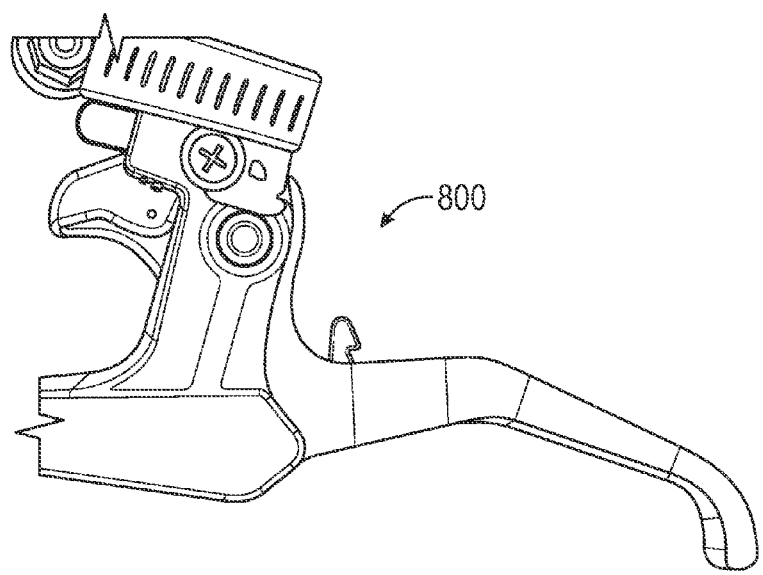
FIG. 14 is a perspective view of a lever system

FIG. 14 depicts a perspective view of a lever system 800, the lever system attachable to a wheelbarrow handle or other handle, such as the handle of a hand cart or other wheeled tool or vehicle.

Figure 15:
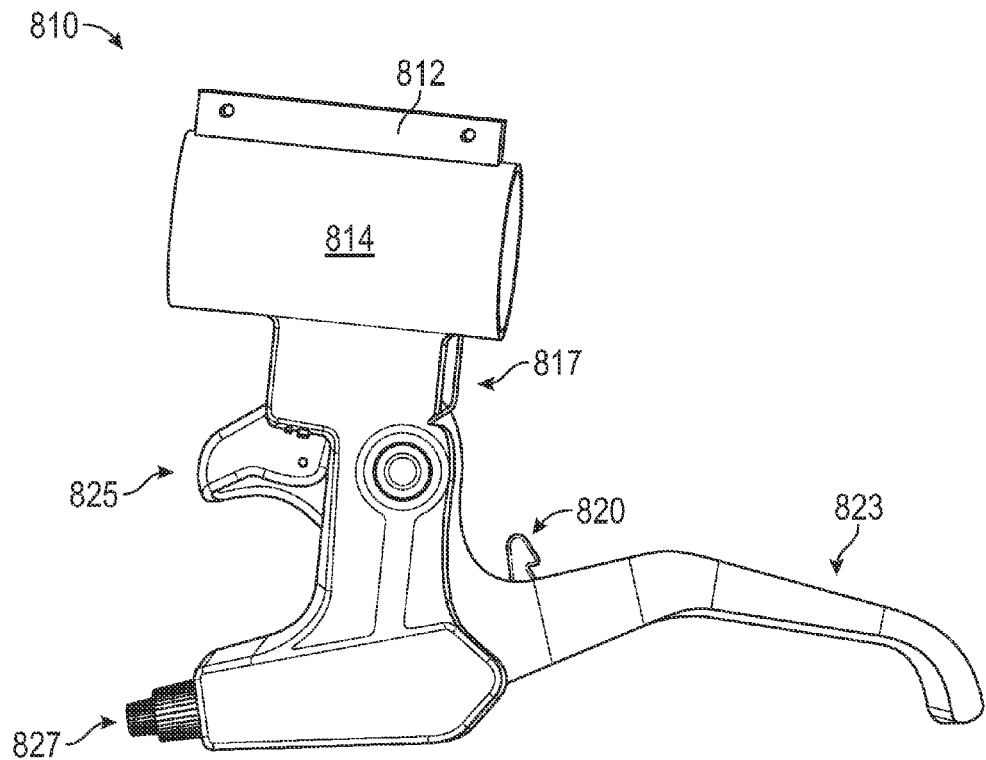
FIG. 15 is a perspective view of a lever system

FIG. 15 depicts a perspective view of a lever system comprising a clamp system 810, the clamp system comprising a barrel retainer wall 814 and a clamp ridge 812. A lever system may further comprise a cuff receiver 817, a cuff clip 820, a brake lever 823, a cuff release button 825 and a cable connection system 827.

Figure 16:
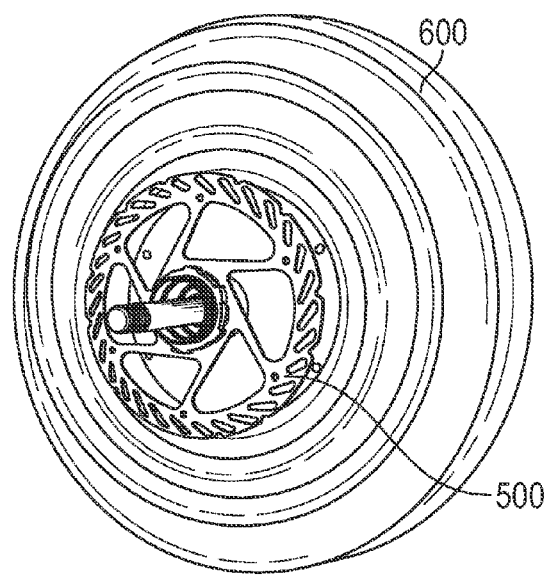
FIG. 16 is a perspective view of a brake disc and related components

FIG. 16 depicts a perspective view of a tire 600, brake disc 500 and related components.

FIG. 17 depicts a hub system 400 comprising an alternative rotor mounting configuration 406 having a threaded hub portion 409 configured to receive a threaded disc rotor, a bearing spacer 404 and a bearing extension 407, the bearing extension configured to support an accessory plate 200. The bearing extension 407 overcomes shortfalls in the known related art by removing or insulating the accessory plate from the vibration and direct rotation of the bearings and axle. The bearing extension 407 may be inserted into the arcuate attachment void 210 of the accessory plate 200.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments may include the following items:

Item 1. An accessory plate 200 comprising a first side and a second side with edge walls 265 between the first side and second side of the accessory plate, the accessory plate further comprising:
 a) an axle side 203 and an brake side, with the axle side comprising an apex curve edge 240, the apex curve edge attached to a first convex curve and a second convex curve;
 b) a lower straight edge 253 attached to the second convex curve of the axle side, the lower straight edge attached to a convex curve 260 of the brake side;
 c) an upper straight edge 250 attached to the first convex curve of the axle side, the upper straight edge attached to the brake side of the accessory plate;
 d) the accessory plate defining one or more connection voids 209 at the brake side;
 e) on the axle side, the accessory plate defining an arcuate attachment void 210; the arcuate attachment void further defined by arcuate wall section 220 attached to a first radial curve section 235 and a second radial curve section 237 with the first radial curve section and the second radial curve section attached to an irregular wall section 230.

Item 2. The accessory plate of 1 in attachment with a hub system, the hub system comprising a disc receiver hub 403, a bearing spacer 404, a bearing 405, a bearing extension 407 and accessory plate extension, a threaded hub portion 409 and a threaded inner hub 415.

Item 3. The accessory plate of 2 including an irregular lock nut 425, attached to the hub system, the irregular lock nut comprising an irregular outer surface 430 and an inner circular smooth surface 432.

Item 4. The accessory plate of 3 including a brake disc 500 comprising a spoke structure 530, the spoke structure defining an irregular void 530 comporting with the irregular outer surface of the irregular lock nut, with the irregular lock nut attached to the irregular void of the brake disc.

Item 5. The accessory plate of 4 including a caliper brake system 300 attached to the brake end of the accessory plate by use of the one or more connection voids of the accessory plate, the caliper brake system containing an outer circumference of the brake disc.

Item 6. The accessory plate of 5 including a cable with a first end and a second end, with the first end attached to the caliper brake system and the second end attached to a lever system 800, the lever system comprising a clamp system 810, a clamp ridge 812, a barrel retainer wall 814, a cuff receiver 817, a cuff clip 820, a brake lever 823, a cuff release button and a cable connection 827.

Item 7. A wheel and hub configuration 400 comprising a rotor mounting configuration 406 comprising a threaded hub portion 409, the threaded hub portion configured to comport to a threaded rotor, the rotor mounting configuration further comprising a bearing spacer 404 and a distal bearing extension 407, the distal bearing extension connected to an accessory plate 200 through an arcuate attachment void 210 defined within the accessory plate 200, the accessory plate comprising an axle side 2043 and a brake side 206.

What is claimed is:

1. An accessory plate comprising a first side and a second side with edge walls between the first side and second side of the accessory plate, the accessory plate further comprising:
 a) an axle side and a brake side, with the axle side comprising an apex curve edge, the apex curve edge attached to a first convex curve and a second convex curve;
 b) a lower straight edge attached to the second convex curve of the axle side, the lower straight edge attached to a convex curve of the brake side;
 c) an upper straight edge attached to the first convex curve of the axle side, the upper straight edge attached to the brake side of the accessory plate;
 d) the accessory plate defining one or more connection voids at the brake side;
 e) on the axle side, the accessory plate defining an arcuate attachment void; the arcuate attachment void further defined by an arcuate wall section attached to a first radial curve section and a second radial curve section with the first radial curve section and the second radial curve section attached to an irregular wall section.

2. The accessory plate of claim 1 in attachment with a hub system, the hub system comprising a disc receiver hub, a bearing spacer, a bearing, a free spinning inner bearing and a bearing extension, a threaded hub portion and a threaded inner hub.

3. The accessory plate of claim 2 including an irregular lock nut, attached to the hub system, the irregular lock nut comprising an irregular outer surface and an inner circular smooth surface.

4. The accessory plate of claim 2 wherein the hub system includes a threaded hub portion in threaded attachment to a brake disc.

5. The accessory plate of claim 3 wherein the brake disc comprises a spoke structure, the spoke structure defining an irregular void comporting with the irregular outer surface of the irregular lock nut, with the irregular lock nut attached to the irregular void of the brake disc.

6. The accessory plate of claim 4 wherein the brake disc comprises a spoke structure, the spoke structure defining a smooth and threaded void comporting with the threaded hub portion, with the threaded hub portion in threaded attachment to the brake disc.

7. The accessory plate of 6 including a caliper brake system attached to the brake end of the accessory plate by use of the one or more connection voids of the accessory plate, the caliper brake system containing an outer circumference of the brake disc.

8. The accessory plate of claim 7 including a cable with a first end and a second end, with the first end attached to the caliper brake system and the second end attached to a lever system, the lever system comprising a clamp system, a clamp ridge, a barrel retainer wall, a cuff receiver, a cuff clip, a brake lever, a cuff release button and a cable connection.

* * * * *